United States Patent [19]
Pfeifer et al.

[11] Patent Number: 5,331,539
[45] Date of Patent: Jul. 19, 1994

[54] MAILING MACHINE INCLUDING MULTIPLE CHANNEL PULSE WIDTH MODULATED SIGNAL CIRCUIT

[75] Inventors: Thomas M. Pfeifer, Bridgeport; Richard P. Schoonmaker, Wilton, both of Conn.

[73] Assignee: Pitney Bowes Inc., Stamford, Conn.

[21] Appl. No.: 983,912

[22] Filed: Dec. 1, 1992

[51] Int. Cl.⁵ .............................................. G05B 11/28
[52] U.S. Cl. ...................................... 364/140; 318/35; 318/599
[58] Field of Search ............... 364/140, 464.02, 464.03; 318/34–39, 46, 49, 51, 53, 59, 66, 67, 112, 599

[56] References Cited

U.S. PATENT DOCUMENTS 4,665,353  5/1987  Salazar et al. .................... 318/599
4,785,224 11/1988  Pfalzgraf et al. ................. 318/599

FOREIGN PATENT DOCUMENTS 4-127899  4/1992  Japan ............................... 318/599

*Primary Examiner*—Jerry Smith
*Assistant Examiner*—Steven R. Garland
*Attorney, Agent, or Firm*—Donald P. Walker; Melvin J. Scolnick; Robert E. Meyer

[57] ABSTRACT

Apparatus for generating a plurality of pulse width modulated signals for separately driving a plurality of electrical loads, comprising, a microprocessor, a plurality of comparator means, each of the comparator structure including first and second input terminals and an output terminal, digital to analog converter structure connected to the microprocessor for control thereby, the converter structure including a plurality of output terminals respectively connected to a different comparator structure first terminal for providing separate control signals thereto, structure for generating a reference voltage signal having a variable amplitude, the signal generating structure connected to each of the comparator structure second terminals for providing the reference voltage signal thereto, a plurality of power amplifiers, a plurality of electrical loads respectively connected to a different comparator structure output terminal via a different power amplifier for receiving therefrom an amplified comparator structure output signal, the microprocessor programmed for selectively addressing the converter structure output terminals, the microprocessor programmed for generating said separate control signals, and each of the comparator structure responsive to a different separate control signal and said variable reference voltage signal for modulating the pulse width of a comparator structure output signal to drive the power amplifier and thus the electrical load connected thereto.

18 Claims, 3 Drawing Sheets

MAILING MACHINE INCLUDING MULTIPLE CHANNEL PULSE WIDTH MODULATED SIGNAL CIRCUIT

BACKGROUND OF THE INVENTION

This invention is generally concerned with a mailing machine including a pulse width modulated signal circuit for controlling a load, and more particularly with a mailing machine base including a multiple channel, pulse width modulated, signal circuit for controlling a plurality of electrical loads.

As shown in U.S. Pat. No. 5,217,551 for a Mailing Machine Including a Process For Selectively Moistening Envelopes Fed Thereto, by John R. Nobile, et. al and assigned to the assignee of the present invention, there is disclosed a mailing machine including a microprocessor which is programmed for controlling separate motors for driving sheet feeding and postage printing structures, and which is programmed for controlling a solenoid for moving a baffle between one position wherein respective sheets are guided thereby into engagement with flap deflecting structure and another position wherein the respective sheets are guided thereby out of engagement with the flap deflecting structure. In such microprocessor applications the microprocessor includes a plurality of timers which are utilized for producing pulse width modulated signals to drive separate power amplifiers connected between the microprocessor and solenoid and each of the motors. Such microprocessor controlled systems are relatively costly to implement due to the high cost of microprocessors which have sufficient capacity to set up multiple timers for controlling multiple pulse width modulated load driving channels. Accordingly:

an object of the invention is to provide an improved mailing machine;

another object is to provide a low cost circuit for driving multiple electrical loads in a mailing machine base;

another object is to provide a multiple channel, pulse width modulated signal control circuit for controlling a plurality of electrical loads; and another object is to provide an inexpensive arrangement of apparatus for implementing pulse width modulated signal control of a plurality of electrical loads, including a solenoid and multiple motors.

BRIEF DESCRIPTION OF THE DRAWINGS

As shown in the drawings wherein like reference numerals designate like or corresponding parts throughout the several views.

SUMMARY OF THE INVENTION

Apparatus for generating a plurality of pulse width modulated signals for separately driving a plurality of electrical loads, comprising, a microprocessor, a plurality of comparator means, each of the comparator means including first and second input terminals and an output terminal, digital to analog converter means connected to the microprocessor for control thereby, the converter means including a plurality of output terminals respectively connected to a different comparator means first terminal for providing separate control signals thereto, means for generating a reference voltage signal having a variable amplitude, the signal generating means connected to each of the comparator means second terminals for providing the reference voltage signal thereto, a plurality of power amplifiers, a plurality of electrical loads respectively connected to a different comparator means output terminal via a different power amplifier for receiving therefrom an amplified comparator means output signal, the microprocessor programmed for selectively addressing the converter means output terminals, the microprocessor programmed for generating said separate control signals, and each of the comparator means responsive to a different separate control signal and said variable reference voltage signal for modulating the pulse width of a comparator means output signal to drive the power amplifier and thus the electrical load connected thereto.

DESCRIPTION OF THE PREFERRED EMBODIMENTS

Figure 1:
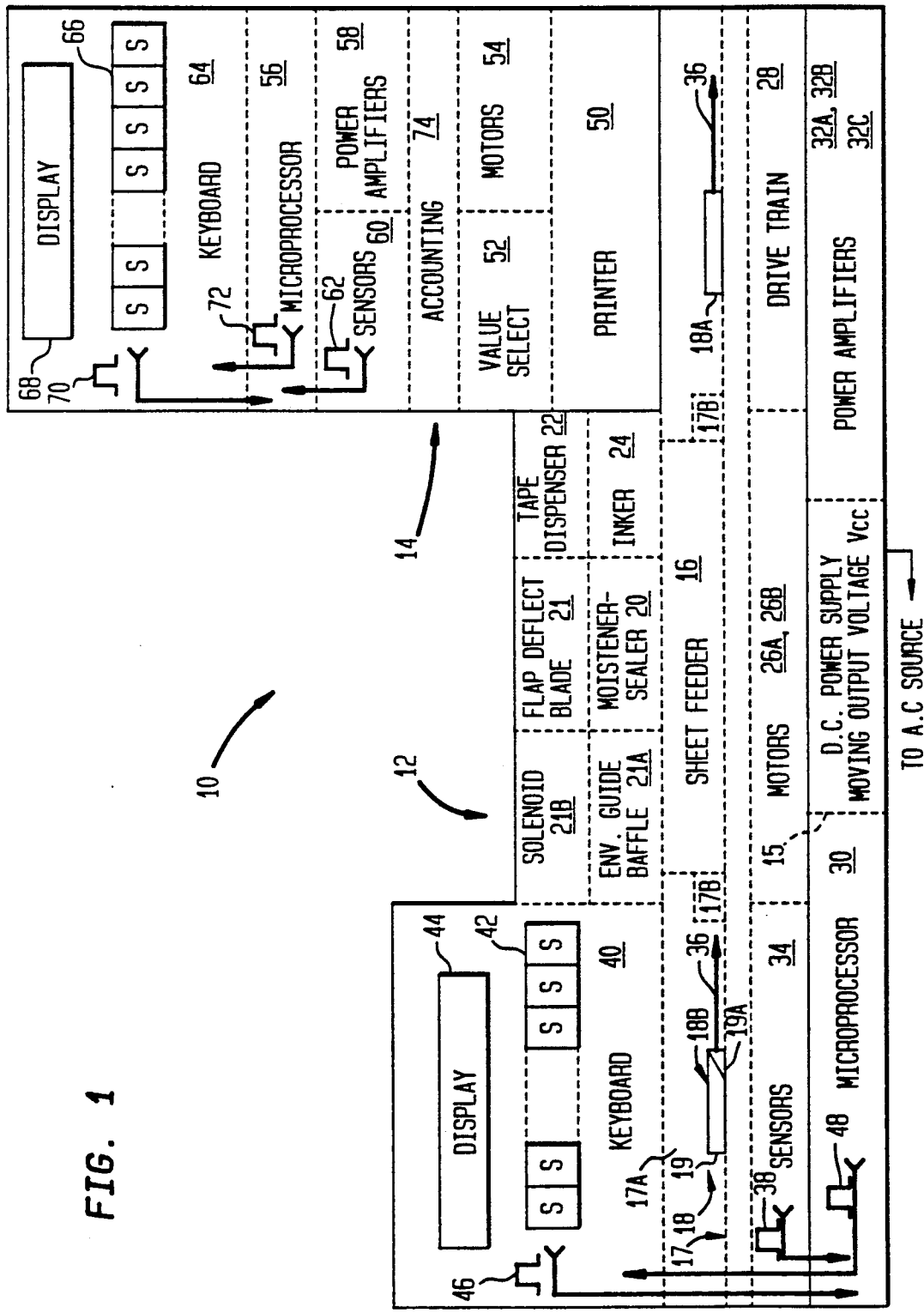
FIG. 1 is as schematic view of an improved mailing machine according to the invention.

As shown in FIG. 1, a mailing machine 10 according to the invention generally includes an improved mailing machine base 12, and includes a conventional postage meter 14 which is suitably removably connected to the base.

The mailing machine base 12 (FIG. 1) preferably includes a conventional source of supply 15 of d.c. power, having a d.c., output voltage level Vcc, which is suitably adapted to be connected to an external source of supply of a.c. power for energization thereof, and thus of the base 12. In addition, the base 12 comprises conventional sheet feeding structure 16, including an elongate horizontally-extending deck 17 an upright registration fence 17A extending alongside of and longitudinally of the length of the deck 17, and a plurality of rollers 17B, which may be one or more belts, or the like, for feeding successive sheets 18 on the deck 17 through the machine 10. Without departing from the spirit and scope of the invention, a given a sheet 18, may be a cut tape 18A, a card, or folded or unfolded letter, or a sealed or unsealed envelope 18B having a body 19, and having a flap 19A. And, the envelope body 19 may be stuffed with one or more cards, folded or unfolded letters, invoices, remittance slips or return envelopes, or other sheets 18. In addition, the mailing machine base 12 includes envelope flap moistening and sealing structure 20, including a suitable source of supply of water (not shown) and a suitable envelope flap deflecting blade 21 for guiding envelope flaps 19A into moistening relationship with the moistening and sealing structure 20. Further, the mailing machine 12 includes a baffle 21A and a solenoid 21B having a spring loaded plunger which is connected to the baffle 21A such that the solenoid 21B is operable against the force of the spring, to position the baffle 21A for guiding sheets 18 toward the flap deflecting blade 21 for moistening and sealing, and is operable to permit the spring to position the baffle 21A for guiding sheets away from the flap deflecting blade 21 for bypassing moistening and sealing. Moreover, the base 12 preferably includes conventional cut tape dispensing structure 22, including a suitable receptacle for receiving and storing a stack of cut tapes 18A and including conventional structure for feeding the cut tapes 18A one at a time from the receptacle. And, the base 12 preferably includes conventional inking structure 24, such as a suitable source of supply of ink, which may be a reservoir of ink or an ink saturated roller and one or more rollers associated therewith for transferring ink therefrom to the printing structure, hereinafter discussed, of the postage meter 14. Still further, the mailing machine base 12 preferably includes a plurality of conventional d.c. motors 26A and 26B, one of which, 26A, is suitably connected to the sheet feeding structure 16, for operation thereof, and another of which 26B is suitably connected to a conventional drive train 28 constructed and arranged for transferring motive power to the postage meter 14 for driving the printing structure hereinafter discussed. Moreover, for controlling the mailing machine base 12, the base 12 preferably includes a conventional microprocessor 30, a plurality power amplifiers 32A, 32B and 32C which are respectively connected between the microprocessor 30 and motors 26A and 26B, and between the microprocessor 30 and solenoid 21B. Further, for controlling the base 12, the base 12 includes a plurality of conventional sensors 34 which are suitably located relative to one or more components of the sheet feeding structure 16, baffle 21A, solenoid 21B, cut tape dispensing structure 22, inking structure 24, motors 26A and 26B, and drive train 28, and relative to the path of travel 36 of respective sheets 18 fed through the machine 10, for providing signals, such as the signal 38, to the microprocessor 30 which are indicative of the position of the plunger of the solenoid 21B, of the angular velocity of the respective motors 26A and 26B, of the position of the baffle 21A and selected components of the drive train and sheet feeding structures, 16 and 28, of one or more positions of selected components of the structures 16, 22, 24, 26 and 28, of the available supply of water or ink, as the case may be, in the moistening and inking structures, 20 or 24, and of one or more positions of a given sheet 18, including a given cut tape 18A, in the path of travel 36. Still further, for controlling the mailing machine base 12, the base 12 additionally comprises a conventional keyboard 40, including a plurality of switches 42 and a suitable display 44 which are conventionally electrically connected to the microprocessor 30 for providing thereto conventional signals, such as the signal 46, for causing the microprocessor 30 to control the base 12, and receiving therefrom conventional signals, such as the signal 48, for driving the display 44. And, the microprocessor 30 is conventionally programmed for, inter alia, responding to signals 38 received from the sensors 34, and to signals 46 received from the keyboard 40 due to manual activation of the switches 42, for timely causing operation of the motors 26A and 26B, and thus of the drive train and sheet feeding structures 16 and 28, and timely causing operation of the solenoid 21B, to cause envelopes 18B to be transported by the sheet feeding structure 16, fed into or out of flap deflecting relationship with the flap deflecting blade 21 by the envelope guiding baffle 21A, and fed through the machine 10, and causing cut tapes 18A to be transported by the sheet feeding structure 16 through the machine 10, and for timely causing the printing structure of the postage meter 14 to print postage indicia on the respective sheets 18 including tapes 18A and envelopes 18B.

The postage meter 14 (FIG. 1) preferably comprises conventional postage indicia printing structure 50, such as a conventional rotary printing drum having a suitable indicia printing die and including a drive shaft, or such as a conventional impact printer having suitable platen and printing die members, constructed and arranged for interfacing with the drive train 28 of the mailing machine base 12 when the postage meter 14 is removably connected thereto. For changing the postage value included in the postage indicia, the postage meter 14 additionally includes conventional value selection structure 52, such as a plurality of conventional printing wheels and a drive train therefor, and also includes one or more motors 54, such as stepper motors, which are respectively coupled to the drive trains of the value selection structure 52. In addition, for controlling the postage meter 14, and thus the postage value changing structure 52, the postage meter 14 includes a conventional microprocessor 56, and includes one or more power amplifiers 58 which are respectively connected between the microprocessor 56 and a different motor 54. Further, for controlling the postage meter 14, the meter 14 also includes a plurality of conventional sensors 60 which are suitably located relative to one or more components of the printing structure 50, value selection structure 52, motors 54 and the path of travel 36 Of respective sheets 18, including cut tapes 18A, fed through the machine 10, for providing signals, such as the signal 62, to the microprocessor 56 which are indicative of one or more positions of selected components of the structures 50, 52 and 54, and of one or more positions of a given sheet 18, including a given cut tape 18A, in the path of travel 36. Still further, for controlling the postage meter 14, the meter 14 additionally comprises a conventional keyboard 64, including a plurality of suitable switches 66 and a suitable display 68 which are conventionally electrically connected to the microprocessor 56 for providing thereto conventional signals, such as the signal 70, for causing the microprocessor 56 to control the postage meter 14, and for receiving therefrom conventional signals, such as the signal 72, for driving the display 68. Moreover, for controlling the postage meter 14, the meter 14 includes conventional accounting structure 74. The accounting structure 74 is conventionally electrically connected to the microprocessor 56 for communicating therewith, and includes, inter alia, data stored therein which corresponds to the current total value of postage available for printing by the meter 14, the current total value of postage printed by the meter 14 and the serial number of the meter 14. And, for controlling the meter 14, the microprocessor 56 is conventionally programmed for, inter alia, responding to value selection signals 70 received from the keyboard 64, due to manual actuation of the switches 66, for causing the microprocessor 56 to energize the motors 54, thereby causing the value selection structure 52 to position the print wheels to print a postage value corresponding to the value selection signals 70, and for causing the microprocessor 56 to access the accounting structure 74 to determine whether or not sufficient total postage is available for printing and, if so, to deduct therefrom an amount corresponding to the value selection signals 70 and to add the same amount to the total value printed, and, in addition, for causing the printing structure 50 to be unlocked to permit the printing of single postage indicia, including the amount corresponding to the value selection signals 70, under the control of the postage meter base 12.

Figure 2:
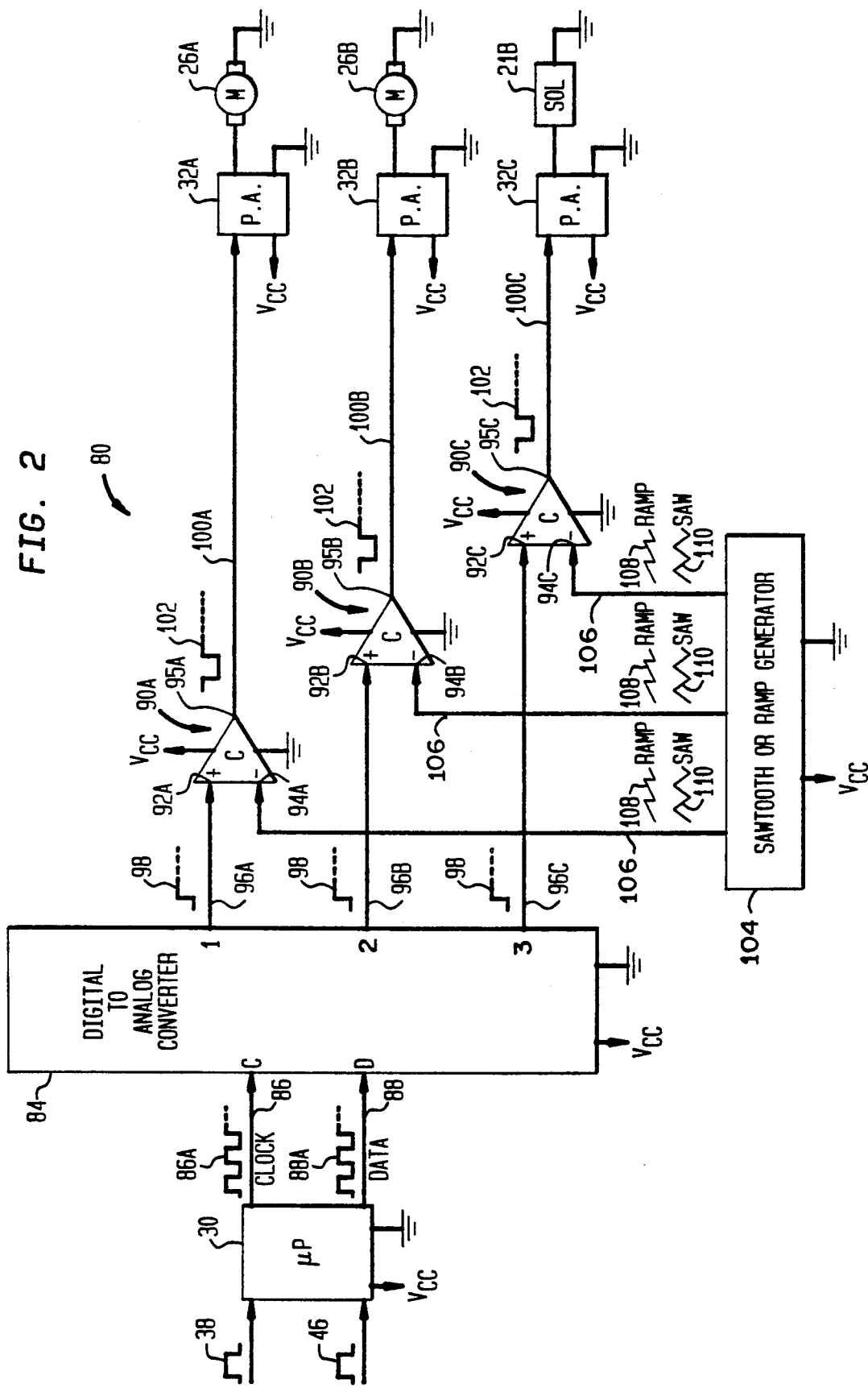
FIG. 2 is a schematic diagram of a multiple channel, pulse wide modulated signal control circuit according to the invention, showing the manner in which a single microprocessor is utilized for controlling a plurality of comparator structures which are selectively utilized for driving a plurality of electrical loads.

As shown in FIG. 2, the multiple channel, pulse width modulated (PWM), load control circuit 80 includes the microprocessor 30 and digital to analog converter structure 84. The converter structure 84 includes clock "c" and data "d" input terminals, and includes a plurality of output terminals nominally designated "1" through "3". The converter structure 84 is electrically connected to the microprocessor 30 via clock and data input leads, 86 and 88, and is responsive to respective signals, such as the signals 86A and 88A, received from the microprocessor 30 for controlling the converter structure 84. In addition, the control circuit 80 includes a plurality of comparator structures, 90A, 90B and 90C. Each of the comparator structures, 90A, 90B and 90C, includes positive "+" and negative "−" input terminals, respectively designated 92A and 94A, 92B and 94B, and 92C and 94C, and includes an output terminal, respectively designated 95A, 95B and 95C. Each of the comparator structure input terminals 92A, 92B and 92C is electrically connected to a different one of the three converter structure output terminals, 1 through 3, via a comparator input control lead 96A, 96B or 96C. And the respective comparator structures 90A, 90B and 90C are responsive to control signals, such as the signal 98, received from the converter structure 84 for controlling the comparator structures 90A, 90B and 90C. Further, for driving the sheet feeding motor 26A (FIG. 1), printing motor 26B and solenoid 21B, the PWM control circuit 80 includes a plurality of power amplifiers 32A, 32B and 32C each of which is electrically connected to the associated comparator structure 90A, 90B or 90C via a comparator output PWM signal lead, 100A, 100B or 100C, for providing PWM signals such as the signal 102 to the respective power amplifiers 32A, 32B and 32C. Moreover, the PWM control circuit 80 includes a conventional variable reference voltage signal generator 104 having a nominal output frequency of 20 KHz. The reference voltage generator 104 is conventionally electrically connected to the negative input terminals 94A, 94B and 94C, of each of the comparator structures, 90A, 90B and 90C, via an electrical lead 106, for providing thereto variable reference voltage signals, which is preferably a ramp 108 or saw-tooth 110 reference voltage signal. Each of the signals 108 and 110 has a low voltage level which is greater than zero, and preferably one third of the d.c. power supply voltage level, Vcc, and a high or peak voltage level which is less than the d.c. power supply voltage level, Vcc, and preferably two-thirds of the d.c. power supply voltage level, Vcc, to ensure positive control of the respective comparator structures 90A, 90B and 90C, and, in particular, of the PWM output signals 102 provided thereby.

For operation of the multiple channel PWM signal circuit 80, the microprocessor 30 is preferably programmed for selectively addressing the respective digital to analog output terminals 1-3, or leads 96A, 96B and 96C, utilizing, for example, the first two bits of a ten bit word for selectively identifying the converter output terminals or channels, 1-3. Further, the microprocessor 30 is preferably programmed for utilizing the remaining 8 bits or byte of the same ten bit word for selectively providing the respective signals 98, one at a time, to each of the channel leads, 96A, 96B and 96C.

Figure 3:
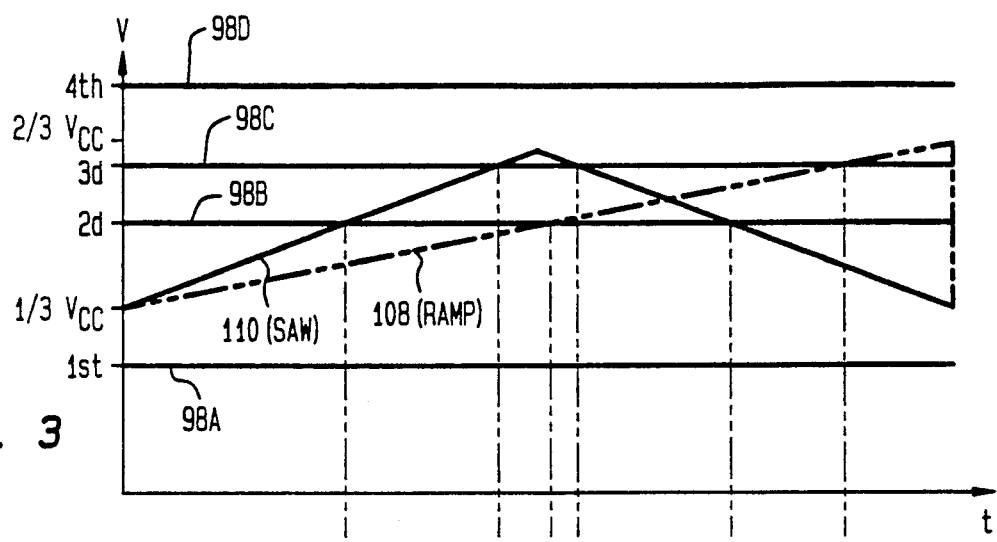
FIG. 3 is a schematic diagram of four comparator input control signals i.e., first, second, third and fourth, superimposed on two variable comparator input reference voltage signals, to illustrate the manner in which the comparator input control signal is utilized for modulating the pulse width of the comparator structure output signal.
Figure 4A:
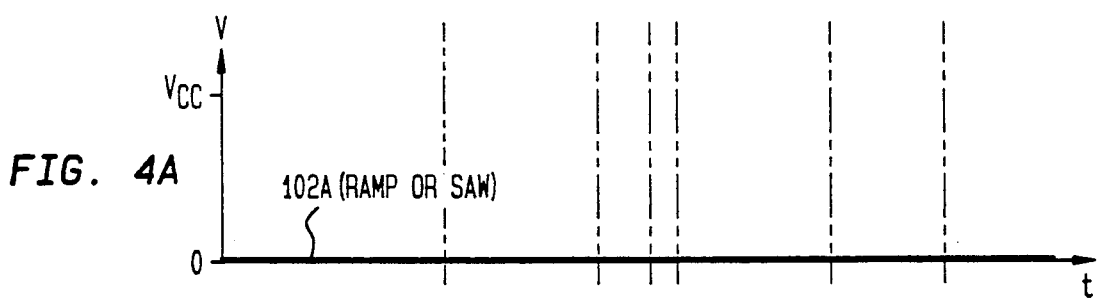
FIGS. 4A, 4B, 4C and 4D are each a schematic diagram of the pulse width modulated comparator structure output signal resulting from utilizing the first, second, third and fourth comparator input control signals shown in FIG. 3.
Figure 4B:
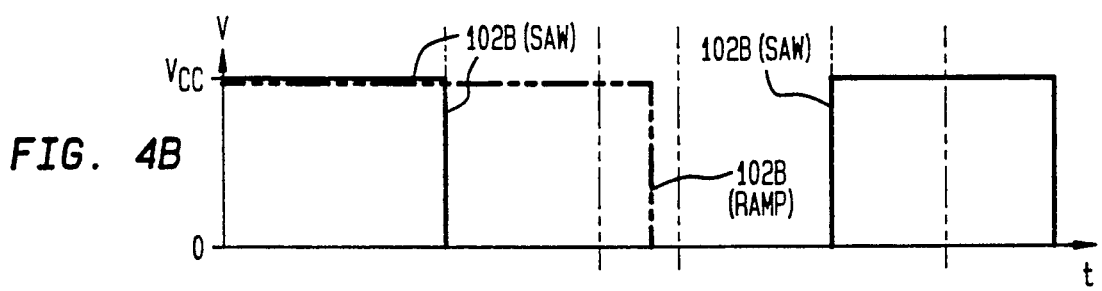
Figure 4C:
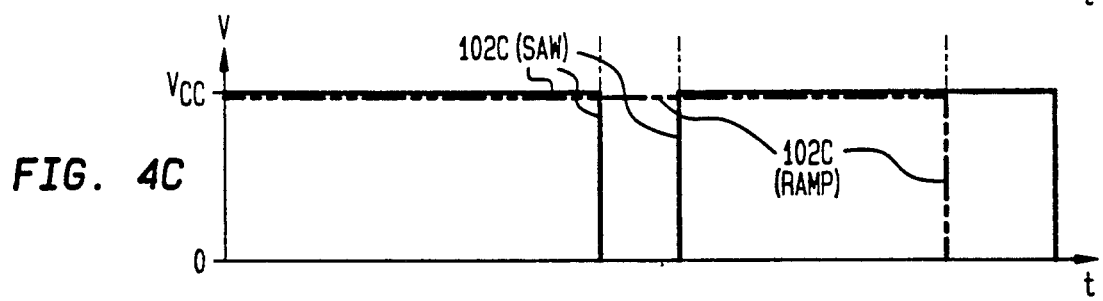
Figure 4D:
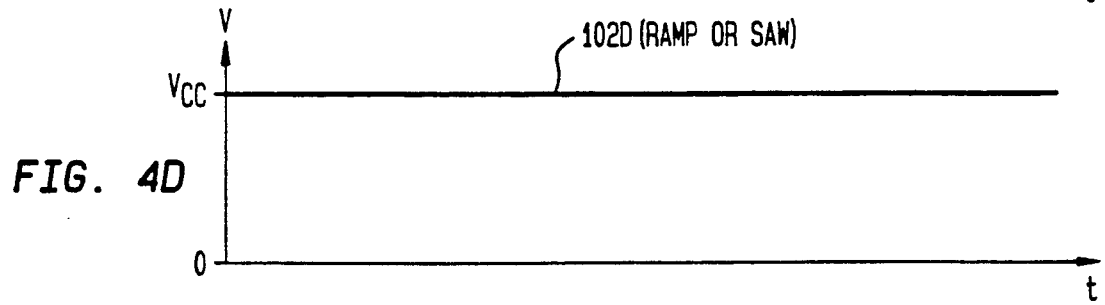

As shown in FIG. 3, four exemplary control signals 98, respectively designated 98A, 98B, 98C and 98D, are superimposed on the alternative ramp 108 and saw-tooth 110 generator output reference voltage signals. Moreover, one of the control signals, 98A, has voltage level which is less than one-third of the d.c. power supply voltage level Vcc, two of the control signals, 98B and 98C, have a voltage level which is more than one third of the d.c. supply voltage level Vcc and less than two-thirds thereof, and one of the control signals 98D has a voltage level which is more than two-thirds of Vcc. When the control signal 98 (FIG. 2) is at a voltage level 98A (FIG. 3) of less than one-third of Vcc, then, the comparator structure output voltage signal 102 (FIG. 2) is at an output voltage level 102A (FIG. 4A) of zero volts, i.e., the comparator structure 84 (FIG. 2) is fully turned off. When the control signal 98 is at a voltage level 98B or 98C (FIG. 3) of more than one-third of Vcc but less than two-thirds of Vcc, then: the comparator structure output voltage signal 102 (FIG. 2) is at the output voltage level, 102B or 102C (FIGS. 4B or 4C), of the d.c. supply, i.e. Vcc, whenever the level of the reference voltage signal, 108 or 110, is less than the voltage level of the control signal 98B or 98C; and, the comparator structure output voltage signal 102 (FIG. 2) is at a zero voltage level (FIGS. 4B or 4C) whenever the level of the reference voltage signal, 108 or 110, is more than the voltage level of the control signal 98B or 98C. And, when control signal 98 (FIG. 2) is at a voltage level 98D which is equal to or more than two-thirds of Vcc, then, the comparator structure output voltage signal 102 (FIG. 2) is at the d.c. supply level, Vcc, i.e., the comparator structure 84 is fully turned on. Moreover, as shown in FIGS. 3 and 4B and 4C, when the voltage level of the comparator structure input control signal 98 is greater than, i.e., more positive than, the voltage level of the comparator structure ramp reference signal 108 or saw-tooth reference signal 110, but less than two-thirds of Vcc, then, as the control signal 98 increases, the duty cycle of the comparator structure output voltage signal 102 proportionally increases. Moreover, as the control voltage signal 98 changes from one-third of Vcc to two-thirds of Vcc, the PWM comparator structure output signal 102 changes from zero to one-hundred percent of Vcc. Accordingly, the relationship between the control voltage signal 98 and PWM signal 102 is linear.

What is claimed is:

1. Apparatus for generating a plurality of pulse width modulated signals for separately driving a plurality of electrical loads, comprising:
   a. a microprocessor;
   b. a plurality of comparator means, each of the comparator means including first and second input terminals and an output terminal;
   c. digital to analog converter means connected to the microprocessor for control thereby, the converter means including a plurality of output terminals respectively connected to a different comparator means first terminal for providing separate control signals thereto;
   d. means for generating a reference voltage signal having a variable amplitude, the signal generating means connected to each of the comparator means second terminals for providing the reference voltage signal thereto;

e. a plurality of power amplifiers;

f. a plurality of electrical loads respectively connected to a different comparator means output terminal via a different power amplifier for receiving therefrom an amplified comparator means output signal;

g. the microprocessor programmed for selectively addressing the converter means output terminals, the microprocessor programmed for generating said separate control signals, and each of the comparator means responsive to a different separate control signal and said variable reference voltage signal for modulating the pulse width of a comparator means output signal to drive the power amplifier and thus the electrical load connected thereto.

2. The apparatus according to claim 1, wherein the variable reference voltage signal is a saw tooth-shaped signal.

3. The apparatus according to claim 2, wherein the saw tooth-shaped signal has a predetermined low voltage level which is greater than zero volts.

4. The apparatus according to claim 2, wherein the saw tooth-shaped signal has a predetermined high voltage level which is less than a maximum available voltage level.

5. The apparatus according to claim 1, wherein the variable reference voltage signal is a ramp-shaped signal.

6. The apparatus according to claim 5, wherein the ramp-shaped signal has a predetermined low voltage level which is greater than zero volts.

7. The apparatus according to claim 5, wherein the ramp-shaped signal has a predetermined high voltage level which is less than a maximum available voltage level.

8. The apparatus according to claim 1, wherein the converter means includes four output terminals, and the program for selectively addressing the converter means output terminals includes programming for utilizing two bits of a ten bit word for addressing each of the four converter means output terminals, and the programming for selectively generating said separate control signals including programming for utilizing the remaining byte of the ten bit word for generating each of said separate control signals.

9. The apparatus according to claim 1, wherein one of the electrical loads is a motor.

10. The apparatus according to claim 1, wherein one of the electrical loads is a solenoid.

11. In a mailing machine base including a solenoid and a motor, apparatus for generating a plurality of pulse width modulated signals for separately driving the solenoid and motor, the apparatus comprising:

a. a microprocessor;

b. a plurality of comparator means, each of the comparator means including first and second input terminals and an output terminal;

c. digital to analog converter means connected to the microprocessor for control thereby, the converter means including a plurality of output terminals respectively connected to a different comparator means first terminal for providing separate control signals thereto;

d. means for generating a reference voltage signal having a variable amplitude, the signal generating means connected to each of the comparator means second terminals for providing the reference voltage signal thereto;

e. a plurality of power amplifiers;

f. the solenoid and motor respectively connected to a different comparator means output terminal via a different power amplifier for receiving therefrom an amplified comparator means output signal;

g. the microprocessor programmed for selectively addressing the converter means output terminals, the microprocessor programmed for generating said separate control signals, and each of the comparator means responsive to a different separate control signal and said variable reference voltage signal for modulating the pulse width of each of the comparator means output signals to drive the power amplifiers and thus the solenoid and motor.

12. The apparatus according to claim 11, wherein the variable reference voltage signal is a saw tooth-shaped signal.

13. The apparatus according to claim 12, wherein the saw tooth-shaped signal has a predetermined low voltage level which is greater than zero volts.

14. The apparatus according to claim 12, wherein the saw tooth-shaped signal has a predetermined high voltage level which is less than a maximum available voltage level.

15. The apparatus according to claim 11, wherein the variable reference voltage signal is a ramp-shaped signal.

16. The apparatus according to claim 15, wherein the ramp-shaped signal has a predetermined low voltage level which is greater than zero volts.

17. The apparatus according to claim 15, wherein the ramp-shaped signal has a predetermined high voltage level which is less than a maximum available voltage level.

18. The apparatus according to claim 11, wherein the converter means includes two output terminals, and the program for selectively addressing the converter means output terminals includes programming for utilizing two bits of a ten bit word for addressing each of the two converter means output terminals, and the programming for selectively generating said separate control signals including programming for utilizing the remaining byte of the ten bit word for generating each of said separate control signals.

* * * * *